United States Patent [19]

Arethens

[11] Patent Number: 5,091,871

[45] Date of Patent: Feb. 25, 1992

[54] METHOD OF DETERMINING THE MEAN WIND SPEED WITH RESPECT TO THE GROUND DURING THE FLIGHT OF AN AIRCRAFT

[75] Inventor: Jean P. Arethens, Drôme, France

[73] Assignee: Sextant Avionique, Valence, France

[21] Appl. No.: 464,876

[22] Filed: Jan. 17, 1990

[30] Foreign Application Priority Data

Jan. 18, 1989 [FR] France ................... 89 00533

[51] Int. Cl.$^5$ .................... G06F 15/20; G06F 15/54
[52] U.S. Cl. ..................... 364/565; 340/968; 364/424.06
[58] Field of Search ............. 340/968; 364/424.06, 364/565, 579; 244/76 C, 177; 73/181, 189

[56] References Cited

U.S. PATENT DOCUMENTS

| | | | |
|---|---|---|---|
| 2,596,472 | 5/1952 | Ergen | 364/424.06 |
| 3,272,974 | 9/1966 | MacCready, Jr. | 364/424.06 |
| 3,948,096 | 4/1976 | Miller | 364/424.06 |
| 3,955,071 | 5/1976 | Lambregts | 364/424.06 |
| 4,038,870 | 8/1977 | Rotier | 73/189 |
| 4,137,764 | 2/1979 | Hallock et al. | 364/439 |
| 4,589,070 | 5/1986 | Kryazis | 364/424.06 |
| 4,646,243 | 2/1987 | Graupp et al. | 364/439 |
| 4,829,441 | 5/1989 | Mandle et al. | 364/565 |
| 4,853,861 | 8/1989 | Ford et al. | 364/424.06 |

FOREIGN PATENT DOCUMENTS 0258498  3/1988  European Pat. Off.
2247731  5/1975  France.

OTHER PUBLICATIONS

J. Elliott "The Computation of the Best Windward and Running Courses for Sailing Yachts", The Radio and Electronic Engineer, vol. 43, No. 12 (Dec. 1973), pp. 715-725.

Primary Examiner—Kevin J. Teska
Attorney, Agent, or Firm—Lowe, Price, Leblanc & Becker

[57] ABSTRACT

A method is provided for determining the speed of the mean wind with respect to the ground during the flight of an aircraft. At each time of rank i of a succession of n times spread out over a flight period, the modulus $V_i$ of the air speed of the aircraft and the three components $S_{Ni}$, $S_{Ei}$ and $S_{Vi}$ of the ground speed of the aircraft are measured. Then, using the method of least squares, the system of $n(n-1)/2$ equations with three unknowns $W_N, W_E$ and $W_V$ is solved:

$$2(S_{Ni}-S_{Nj})W_N + 2(S_{Ei}-S_{Ej})W_E + 2(S_{Vi}-S_{Vj})W_V$$
$$= S_{Ni}^2 - S_{Nj}^2 + S_{Ei}^2 - S_{Ej}^2 + S_{Vi}^2 - S_{Vj}^2 + V_j^2 - V_i^2 \qquad (5)$$

in which $W_N, W_E$ and $W_V$ are the three components of the mean wind speed, during the flight period. In response to the components thus determined, the equipment of the aircraft which is sensitive to the wind, for example the firing equipment, is controlled.

22 Claims, 2 Drawing Sheets

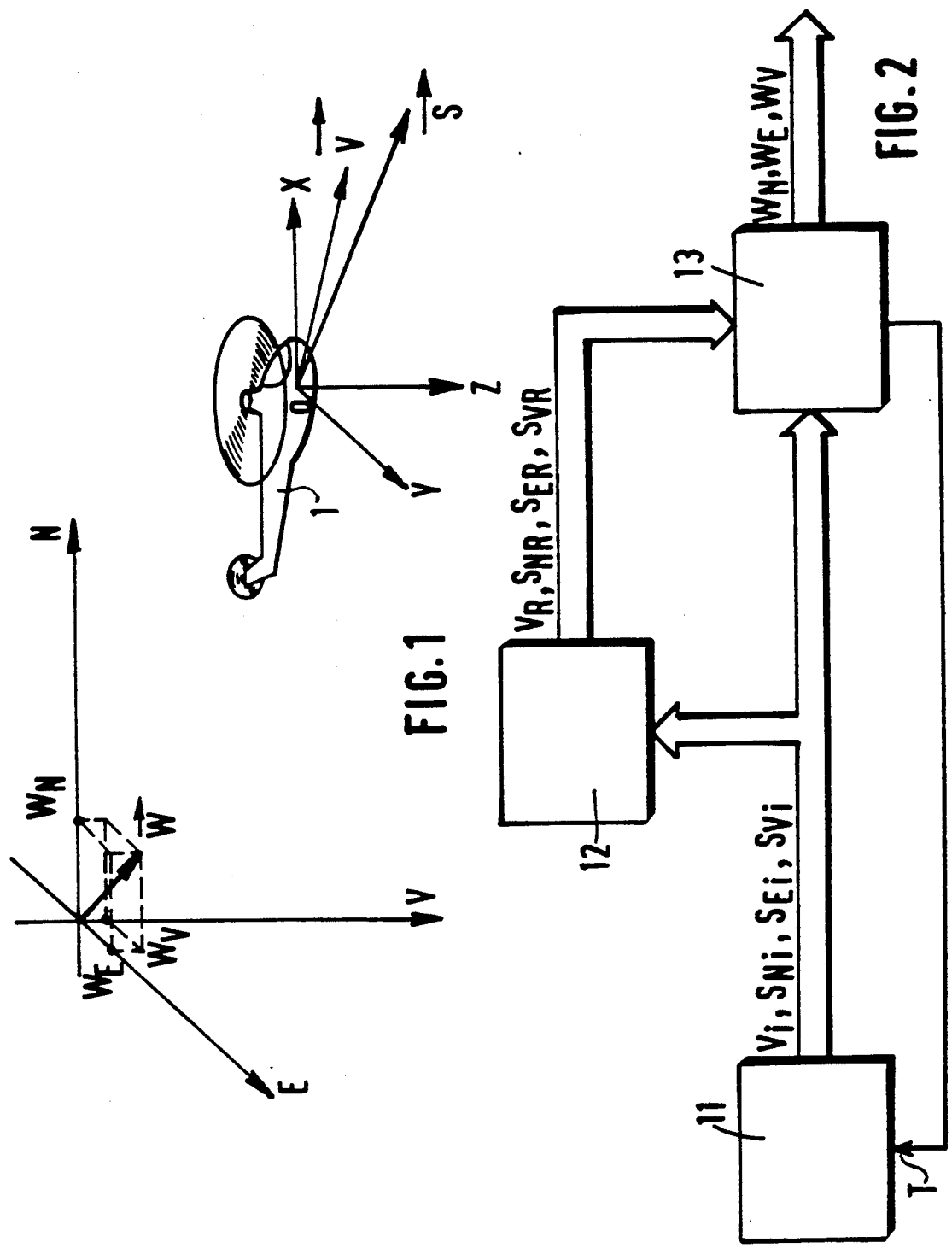

METHOD OF DETERMINING THE MEAN WIND SPEED WITH RESPECT TO THE GROUND
DURING THE FLIGHT OF AN AIRCRAFT

BACKGROUND OF THE INVENTION

The present invention relates to the determination of the mean wind with respect to the ground during the flight of an aircraft.

Usually, on board an aircraft, for example an aeroplane or else a helicopter, the three components $W_N$, $W_E$, $W_V$, measured in a reference frame related to the ground, of the wind speed with respect to the ground are not known. In fact, airborne instruments exist which deliver the three components $S_N$, $S_E$, $S_V$, measured in a reference frame related to the ground, of the ground speed of the aircraft, as well as the modulus $V$ of the speed of the aircraft with respect to the air mass in which it is moving, also called air speed of the aircraft. Now, the relation which relates $\vec{W}$, the speed vector of the wind with respect to the ground, $\vec{S}$, the speed vector of the aircraft with respect to the ground and $\vec{V}$, the air speed vector of the aircraft is:

$$\vec{S} = \vec{W} + \vec{V}$$

The result is that the three components of the vector $\vec{W}$ cannot be determined from the three components of vector $\vec{S}$ and from the modulus $V$ of vector $\vec{V}$ alone.

Now, the knowledge of the three components of the wind with respect to the ground is useful on board an aircraft particularly during flight tests, the knowledge of the three components of the wind makes is possible to estimate accurately the performances of the aircraft in the presence of wind. In normal flight, it allows the pilot or certain servomechanisms to act on the control of certain members of the aircraft which are sensitive to the wind and in particular on the firing means carried on board for correcting, as a function of the wind, the firing parameters so that the objectives are reached despite the existence of wind.

An object of the present invention is then to overcome at least partially the drawbacks which appear for aircraft on board of which the three components of the wind speed with respect to the ground are not known.

For this, it has first of all as object a method for determining the three components $W_N$, $W_E$, $W_V$, in an Earth reference frame, of the speed with respect to the ground of the mean wind during a flight period of an aircraft, for controlling equipment of said aircraft which is sensitive to the wind, in which:

at each time of rank i of a succession of times spread out over said period, the value $V_i$ of the modulus of the speed of the aircraft with respect to the air mass in which it moves and the values $S_{Ni}$, $S_{Ei}$, $S_{Vi}$ of the three components, in said Earth reference frame, of the ground speed of said aircraft are measured, said measured values are stored and using the method of least squares, a system of equations with three unknowns $W_N$, $W_E$, $W_V$ is solved, in which system the current equation is:

$$2(S_{Ni}-S_{NR})W_N + 2(S_{Ei}-S_{ER})W_E + 2(S_{Vi}-S_{VR})W_V = S_{Ni}^2 - S_{NR}^2 + S_{Ei}^2 - S_{ER}^2 + S_{Vi}^2 - S_{VR}^2 + V_R^2 - V_i^2$$

$V_R$, $S_{NR}$, $S_{ER}$ and $S_{VR}$ being values stored before the time of rank i, of said modulus and of said three components of the ground speed of said aircraft, respectively.

It will be noted that the method of the invention does not propose determining, at each time of rank i, the three components $W_{Ni}$, $W_{Ei}$, $W_{Vi}$ from the knowledge of the three components $S_{Ni}$, $S_{Ei}$, $S_{Vi}$ and of the modulus $V_i$ alone. It is obvious that such determination is impossible. However, the Applicant having observed that generally the wind remains substantially constant in the Earth reference frame during a flight, he has perfected the method of the invention which makes possible the determination of the three components of the means wind during this flight, which components already form useful data.

In the method of the invention, and as will be better understood hereafter, the insufficiency of the number of independent measurements at each measuring time is compensated for by the plurality of measuring times. This characteristic, associated with a judicious equation arrangement makes it possible, assuming that the wind remains substantially the same, to determine the three unknown components.

The present invention also has as object a method of determining the three components $W_N$, $W_E$, $W_V$, in an Earth reference frame, of the speed with respect to the ground of the mean wind during a flight period of an aircraft, for controlling the equipment of said aircraft sensitive to the wind, in which:

at each time of rank i of a succession of times spread out over said period, the value $V_i$ of the modulus of the speed of the aircraft with respect to the air mass in which it moves, the values $S_{Ni}$, $S_{Ei}$, $S_{Vi}$ of the three components, in said Earth reference frame, of the ground speed of said aircraft, and the value $\theta_i$ of the pitch angle are measured, said measured values are stored, the vertical component $W_V$ is computed from the formula:

$$W_V = (1/i) \sum_{k=1}^{i} S_{Vk} - V_k \sin\theta_k$$

and using the method of least squares, the system of equations is solved in which the two unknowns are the two horizontal components $W_N$ and $W_E$, in which system the current equation is:

$$2(S_{Ni}-S_{NR})W_N + 2(S_{Ei}-S_{ER})W_E = S_{Ni}^2 - S_{NR}^2 + S_{Ei}^2 - S_{ER}^2 + V_R^2 \cos^2\theta_R - V_i^2 \cos^2\theta_i$$

$V_R$, $S_{NR}$, $S_{ER}$ and $\theta_R$ being values, stored before the time of rank i, of said modulus, of said two horizontal components of the ground speed of said aircraft and of said pitch angle, respectively.

In the case where the vertical component of the wind is small, this method makes rapid determination possible.

In a first implementation of the method of the invention said succession of times spread out over said period comprises in all n times, n being at least equal to three, said values stored before the time of rank i are those measured at any time of rank j less than i, and a system of n (n−1)/2 equations is solved.

This implementation makes it possible to obtain an accurate result for it is established from a large number of equations.

In a second implementation of the method of the invention, said values stored before the time of rank i are averages of a plurality of values measured at times of rank j, less than i, and a system of (i−1) equations is solved in real time.

This implementation is well adapted to real time determination for the computing time is relatively reduced.

The invention also has as object a device for implementing the above method, for determining the three components $W_N$, $W_E$, $W_V$, in an Earth reference frame, of the speed with respect to the ground of the mean wind during the flight of an aircraft, for controlling equipment of said aircraft which is sensitive to the wind, comprising:

means for measuring, at each time of rank i of a succession of times spread out over said period, the value $V_i$ of the modulus of the speed of the aircraft with respect to the air mass in which it moves and the values $S_{Ni}$, $S_{Ei}$, $S_{Vi}$ of the three components, in said Earth reference frame, of the ground speed of said aircraft, means for storing said measured values and means for solving, using the method of least squares, a system of equations with three unknowns $W_N$, $W_E$, $W_V$, in which system the current equation is:

$$2(S_{Ni}-S_{NR})W_N+2(S_{Ei}-S_{ER})W_E+2(S_{Vi}-S_{VR})W_V=S_{Ni}^2-S_{NR}^2+S_{Ei}^2-S_{ER}^2+S_{Vi}^2-S_{VR}^2+V_R^2-V_i^2$$

$V_R$, $S_{NR}$, $S_{ER}$ and $S_{VR}$ being values, stored before the time of rank i in said storage means, of said modulus and of said three components of the ground speed of said aircraft, respectively.

BRIEF DESCRIPTION OF THE DRAWINGS

The present invention will be better understood from the following description of a preferred implementation of the method of the invention, and of the preferred embodiment of the device of the invention, and of some of their variants, with reference to the accompanying drawings in which;

FIG. 1 shows schematically a helicopter during flight,

FIG. 2 shows a block diagram of a device of the invention, carried on board the helicopter of FIG. 1.

DESCRIPTION OF THE PREFERRED EMBODIMENTS

Figure 3:
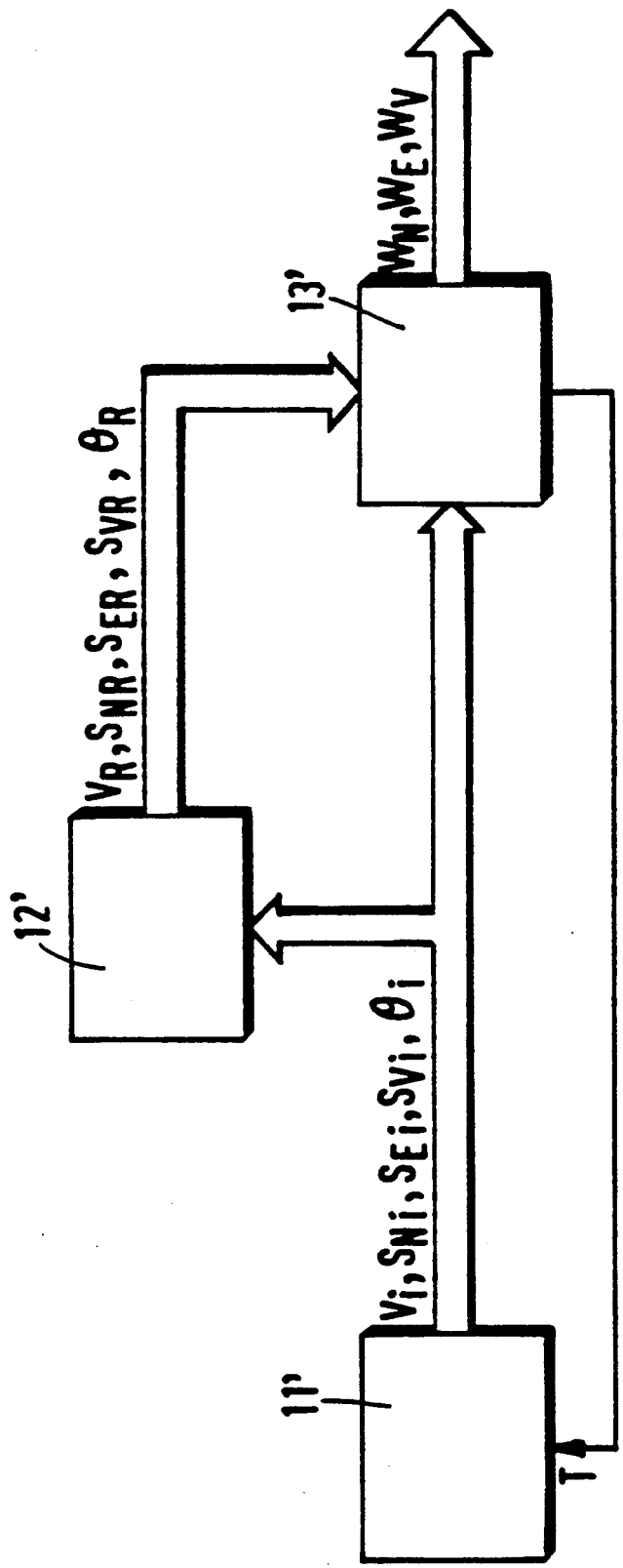
FIG. 3 shows a block diagram of a variant of the device of FIG. 2.

Referring to FIG. 1, an aircraft, in this case a helicopter 1, is shown in flight.

The helicopter 1 is travelling, with respect to the air mass in which it moves, at an air speed shown by a vector $\vec{V}$. With respect to the ground, it travels at a speed represented by a vector $\vec{S}$, which is here different from air speed $\vec{V}$, because of the existence of a wind which drives the air mass in which the helicopter 1 moves at a speed, with respect to the ground, represented by a wind vector $\vec{W}$.

The method and device of the invention make it possible to determine, on board helicopter 1 and from the data alone delivered by its conventional airborne instruments during a flight period, the three components, in an Earth reference frame, of a vector representing the mean wind during this period.

Since, in practice, the variations of the wind, about the mean wind, are relatively slow, the knowledge of the mean wind during a flight period is sufficiently representative of the wind during this period. In addition, if this period is that which has just elapsed, the value of the mean wind forms a good prediction of the value of the wind to come, at least in the immediate future.

The mean wind thus determined is therefore used for estimating the performances of the helicopter in the presence of wind, and for controlling the equipment of the helicopter which is sensitive to the wind.

In a way known per se, a reference frame OXYZ is related to the helicopter 1, the axis OX being a longitudinal axis directed forwards of helicopter 1, axis OY being a transverse axis directed to the right of its pilot and axis OZ is an axis directed downward, here merging with the axis of the hub of its rotor.

Similarly, the Earth reference frame comprises here an axis N directed towards the North, an axis E directed towards the East, and an axis V directed vertically downwards.

In what follows, for the sake of simplifying the notations, with wind $\vec{W}$ constant in modulus and direction in the Earth reference frame during the flight period considered, the three components of the mean wind to be determined are assumed to be the three components $W_N$, $W_E$ and $W_V$ in the Earth reference frame.

The method of the invention is based on the one hand on the relation which relates the vectors $\vec{S}$, $\vec{V}$ and $\vec{W}$ together and on the other hand on the fact that the airborne instruments provide at all times the value of the modulus of the vector $\vec{V}$ and of the three components of the vector $\vec{S}$ in the Earth reference frame.

The relation which relates the vectors $\vec{S}$, $\vec{V}$ and $\vec{W}$ is the relation already written:

$$\vec{S}=\vec{V}+\vec{W} \quad (1)$$

The airborne instruments comprise an anemobarometric sensor of known type, comprising for example a Pitot tube which measures at all times the modulus of vector V in the reference frame OXYZ, the result of the measurement being however valid only for values of this modulus greater than a given threshold, whose value is here equal to 45 knots. The airborne instruments also comprise a device for measuring the three components, in the Earth reference frame, of the vector $\vec{S}$, namely $S_N$, $S_E$ and $S_V$. This device is for example an inertial unit which comprises accelerometers disposed on a platform held horizontal by inertia. In such an inertial unit, the three components of the speeds $S_N$, $S_E$ and $S_V$ are obtained by integrating the measurements made by the accelerometers. However, since such a unit is of a relatively high cost price, all aircraft are not equipped with them. In such a case, a device is however provided for measuring the three components, in the helicopter reference frame, of vector $\vec{S}$, namely $S_X$, $S_Y$ and $S_Z$. Such a device comprises for example a Doppler radar. An attitude unit is also provided which measures the heading $\psi$, pitch $\theta$ and roll $\phi$ angles of the aircraft and a computer which, from the three components $S_X$, $S_Y$ and $S_Z$ and from the angles $\psi$, $\theta$ and $\phi$ calculates the three components $S_N$, $S_E$, $S_V$ of vector S in the Earth reference frame, from equations passing from the helicopter reference frame to the Earth reference frame and which are well known to a man skilled in the art. We may then say that in all cases the airborne instruments measure the three components $S_N$, $S_E$, $S_V$.

If we consider a succession of n measuring times $t_1, t_2, \ldots, t_i, \ldots t_n$ spread out over the flight period considered, we have for each time $t_i$, of rank i, four scalar magnitudes which are:

the modulus $V_i$ of the vector $\bar{V}$ and the three components $S_{Ni}$, $S_{Ei}$, $S_{Vi}$ of the vector $\bar{S}$ in the Earth reference frame.

Now, the relation (1) may be written:

$$\hat{S} - \hat{W} = \hat{V} \qquad (2)$$

The relation (2), written in modulus and at time $t_i$, gives the equation:

$$(S_{Ni} - W_N)^2 + (S_{Ei} - W_E)^2 + (S_{Vi} - W_V)^2 = V_i^2 \qquad (3)$$

Equation (3) represents the fact that, in the Earth reference frame, the end of vector $\bar{W}$ is on a sphere $SP_i$ centered at the point of coordinates ($S_{Ni}$, $S_{Ei}$, $S_{Vi}$) and of radius $V_i$.

We then have n equations such as relation (3) each of them being relative to a different time of rank i.

If we subtract the equation relative to time $t_i$, term by term, from that relative to time $t_j$, we obtain the equation:

$$(S_{Nj} - W_N)^2 - (S_{Ni} - W_N)^2 + (S_{Ej} - W_E)^2 - \qquad (4)$$

$$(S_{Ei} - W_E)^2 + (S_{Vj} - W_V)^2 - (S_{Vi} - W_V)^2 = V_j^2 - V_i^2$$

which becomes:

$$2(S_{Ni} - S_{Nj})W_N + 2(S_{Ei} - S_{Ej})W_E + 2(S_{Vi} - S_{Vj})W_V = S_{Ni}^2 - S_{Nj}^2 + S_{Ei}^2 - S_{Ej}^2 + S_{Vi}^2 - S_{Vj}^2 + V_j^2 - V_i^2 \qquad (5)$$

The equation (5) represents the fact that, in the Earth reference frame, the end of vector $\bar{W}$ is on the radical plane of the sphere $SP_i$ and of the sphere $SP_j$, namely the plane which contains the circle on which these two spheres intersect, when they have at least one common point, which is in principle the case here.

By writing all the equations such as (5) for all the pairs i, j, i being different from j, we obtain a system of n (n−1)/2 equations with three unknowns $W_N$, $W_E$, $W_V$.

This system is then solved by the method of least squares for determining the three unknowns $W_N$, $W_E$, $W_V$, which are the three components of the mean wind to be determined.

In the method of the invention it will be understood that it is the fact of solving the system of n (n−1)/2 equations by linear regression which introduces averaging of the components $W_N$, $W_E$, $W_V$.

In fact, if we take an ideal theoretical situation in which vector $\bar{W}$ is strictly constant and the measurements of $V_i$, $S_{Ni}$, $S_{Ei}$, $S_{Vi}$ are exact, three equations such as equation (5) are sufficient for determining $W_N$, $W_E$, $W_V$.

In this case, the three spheres defined by these three equations have a common point and only one whose three coordinates are the three components sought. In this ideal case, increasing the measurement times makes it possible to form other groups of three spheres whose common point is always the same.

However, in the practical cases where vector $\bar{W}$ varies slightly between two measurement times and where the measurements of $V_i$, $S_{Ni}$, $S_{Ei}$, $S_{Vi}$ are erroneous, it will be understood that the end spheres of equation (5) no longer have, properly speaking, a common point and that this common point explodes in fact into a cloud of points, which volume is more or less wide and inside which all the spheres pass.

In this case, the method of the invention provides a solution to the problem raised by determining the mean coordinates of this volume. In addition, the passage through the equations (5) of the radical planes and application of the method of least squares to the system of equations (5) leads to a result which is quite satisfactory, not only in so far as the accuracy of the result is concerned but also the computing time.

Such as described, the method of the invention lends itself well to delayed time processing. In this case, during the flight period considered, it is enough to make n measurements for the n times of the succession distributed as well as possible over the period. When the period has elapsed and when the measurements have been stored, the system of n (n−1)/2 equations is solved so as to know the components of the mean wind during the measurement period.

It is also possible to carry out real time processing continuously, by solving, between time $t_i$ and time $t_{i+1}$ the system of n (n−1)/2 equations formed from the measurements at times $t_{i-n}, t_{i-n+1}, \ldots, t_i$.

In the case of real time processing, the size of the system to be solved may however be reduced and so shorten the computing time, by forming the following equation, from the measurements made at time $t_i$:

$$2(S_{Ni} - S_{NR})W_N + 2(S_{Ei} - S_{ER})W_E + 2(S_{Vi} - S_{VR})W_V = S_{Ni}^2 - S_{NR}^2 - S_{Ei}^2 - S_{ER}^2 - S_{Vi}^2 - S_{VR}^2 + V_R^2 - V_i^2 \qquad (5')$$

and using this equation as soon as it is available for carrying out a recursive step in the method of least squares.

The equation (5') is identical to the equation (5) except that the values $S_{Nj}$, $S_{Ej}$, $S_{Vj}$ and $V_j$ are there replaced by values $S_{NR}$, $S_{ER}$, $S_{VR}$ and $V_R$ respectively, which are the averages of the plurality of values measured at times of rank j less than i, in accordance with the formulae:

$$S_{NR} = 1/(i-1) \sum_{k=1}^{i-1} S_{Nk} \qquad (6)$$

$$S_{ER} = 1/(i-1) \sum_{k=1}^{i-1} S_{Ek}$$

$$S_{VR} = 1/(i-1) \sum_{k=1}^{i-1} S_{Vk}$$

$$V_R = 1/(i-1) \sum_{k=1}^{i-1} V_k$$

In this case, the equation system to be solved by the method of least squares comprises, at time $t_i$, only (i−1) equations and, in addition, it is solved in real time to the extent that each measurement time such as $t_i$ gives rise to a single additional equation which is immediately taken into account for solving the system.

In the case where the method of the invention is used in real time, it is advisable to provide initialization at regular intervals, so that the components of the wind determined at a given time do not depend on what they were at a previous time too distant from this time. For example, the procedure may be re-initialized every minute. Since, for the times which follow re-initialization, the number of equations of the solved system is small, the determined values of the components of the wind are unreliable. In this case, a weighted average of the result determined just before initialization and of the result determined at the present time may be delivered as result, the weighting coefficient being variable in time, so as to give more and more weight to the result of the present time. In fact, this is all the more reliable the larger the number of equations, such as (5) or (5'), which are taken into account, namely the further away from the previous initialization time.

In the particular case in which the component of the vertical wind is small, the method of the invention may be simplified so as to shorten the computing time for solving the system of equations. In fact, if the vertical wind is small, it may be assumed that the component $V_{Vi}$ along the vertical axis of the Earth reference frame, of the air speed $\bar{V}$ of the helicopter is equal to:

$$V_{Vi} = V_i \sin \theta_i \tag{7}$$

in which expression $\theta_i$ is the pitch angle measured at the same time $t_i$ as the modulus $V_i$ of the air speed $\bar{V}$.

The projection of the relation (2) on the vertical axis of the Earth reference frame gives the equation:

$$S_{Vi} - W_{Vi} = V_i \sin \theta_i \tag{8}$$

which makes it immediately possible to determine $W_{Vi}$ and the component $W_V$ as average of $W_{Vi}$, according to the relation:

$$W_V = (1/i) \sum_{k=1}^{i} S_{Vk} - V_k \sin\theta_k \tag{9}$$

The projection of the relation (2) on the horizontal plane of the Earth reference frame gives the equation:

$$(S_{Ni} - W_N)^2 + (S_{Ei} - W_E)^2 = V_i^2 \cos^2\theta_i \tag{10}$$

The equation (10) represents the fact that, in the horizontal plane, the end of the projection of vector $\bar{W}$ is on a circle $C_i$ centered at the point of coordinates $(S_{Ni}, S_{Ei})$ and of radius $V_i \cos \theta_i$.

We therefore have n equations such as the relation (10). If the equation relative to time $t_i$ is substracted term by term from that relative to time $t_j$, we obtain the equation:

$$(S_{Nj} - W_N)^2 - (S_{Ni} - W_N)^2 + (S_{Ej} - W_E)^2 - (S_{Ei} - W_E)^2 = V_j^2 \cos^2\theta_j - V_i^2 \cos^2\theta_i \tag{11}$$

which becomes:

$$2(S_{Ni} - S_{Nj})W_N + 2(S_{Ei} - S_{Ej})W_E = S_{Ni}^2 - S_{Nj}^2 + S_{Ei}^2 - S_{Ej}^2 + V_j^2 \cos^2\theta_j - V_i^2 \cos^2\theta_i \tag{12}$$

The equation (12) represents the fact that, in the horizontal plane, the projection of the end of vector $\bar{W}$ is on the radical axis of circle $C_i$ and circle $C_j$, i.e. of the straight line which contains the two intersection points of these two circles.

We then obtain, as before, a system of $n(n-1)/2$ equations, with two unknowns $W_N$ and $W_E$ only, which system is solved by the method of least squares.

Naturally, and as was explained in connection with the system of equations (5), it is possible to solve in real time a system whose current equation is:

$$2(S_{Ni} - S_{NR})W_N + 2(S_{Ei} - S_{ER})W_E = S_{Ni}^2 - S_{NR}^2 + S_{NR}^2 + S_{Ei}^2 - S_{ER}^2 + V_R \cdot 2\cos^2\theta_R - V_i^2 \cos^2\theta_i \tag{12'}$$

$S_{NR}$, $S_{ER}$ and $V_R$ being defined by the equations (6) and $\theta_R$ being equal to:

$$\theta_R = 1/(i-1) \sum_{k=1}^{i-1} \theta_k \tag{13}$$

Examples of devices using the above described method, as well as its variant will now be described with reference to FIGS. 2 and 3.

In FIG. 2, block 11 comprises the device for measuring the modulus of the air speed of helicopter 1, as well as the device for measuring the three components, with respect to the ground, of the ground speed. It has a digital output and a binary input. The binary input receives a synchronization signal T which defines the measurement time, here each time $t_i$, and the digital output delivers, in digital form, the measured values $V_i$, $S_{Ni}$, $S_{Ei}$ and $S_{Vi}$.

Block 12 here comprises a memory and, if required, a computing circuit. Block 12 has a digital input which receives the digital values $V_i$, $S_{Ni}$, $S_{Ei}$ and $S_{Vi}$ and a digital output which delivers the values $V_R$, $S_{NR}$, $S_{ER}$ and $S_{VR}$. The latter values are either the set of values measured at any time of rank j, less than 1, in the case of delayed time processing for example, or the averages defined by the equations (5) in the case of real time processing, for example. The computing circuit of block 12 then computes the averages.

Finally, block 13 is a computer, for example a microprocessor having an output delivering the signal T, a digital input receiving the values $V_i$, $S_{Ni}$, $S_{Ei}$ and $S_{Vi}$, a digital input receiving the values $V_R$, $S_{NR}$, $S_{ER}$ and $S_{VR}$ and an output delivering the values $W_E$, $W_N$ and $W_V$ of the three components of the mean wind. The computer 13 is adapted for solving, using the method of least squares, the system whose current equation is the equation (5').

In FIG. 3, the blocks 11', 12' and 13' correspond respectively to blocks 11, 12 and 13 of FIG. 2, but they are provided for implementing the variant of the valid method when the vertical component of the wind is small.

Block 11' therefore delivers, in addition to the values delivered by block 11, the value $\theta_i$ of the pitch angle.

Block 12' stores this value and delivers the corresponding value $\theta_R$, and the computer 13' is adapted for computing the component $W_V$ according to the formula (9) and for solving, using the method of least squares, the system whose current equation is the equation (12').

Naturally, whatever the variant used, determination of the components of the mean wind will be all the more accurate the more the attitudes of the aircraft and its speed differ from one time to another.

In fact, each equation such as (5') or (12') being obtained by term by term subtraction of two equations, it is important for the coefficients of these two equations to be not too closely related, so that the accuracy related to their difference remains satisfactory.

Similarly, the duration of the measurement time may be adjusted as a function of the rate of wind variation, as well as the number n and the distribution of the points, particularly so as to take into account the preceding requirements.

In connection with the number of measurement times, for example the number n, it will be noted that it must obviously be at least equal to three, so that the system of $n(n-1)/2$ equations has at least three equations.

When, as has been described, the Pitot tube only makes valid measurements if the modulus of the speed of the air is greater than 45 knots, the pilot of the helicopter does not have data concerning the speed of the air at low speeds. This may be troublesome for good piloting. In this case, the invention makes it possible to estimate the speed of the air, obtained by composing the last components validly determined of the speed of the wind with the components, measured validly permanently, of the ground speed of the helicopter, in accordance with relation (2). By "last validly determined components" is meant those which were determined just before the modulus of the speed of the air becomes less than the threshold of 45 knots. Thus an estimation of the speed of the air is obtained which makes up for the deficiencies of the Pitot tube. Naturally, the shorter the duration of the low speed period, the slower are the real variations of the wind, and the better the estimation.

What is claimed is:

1. A device for providing the three components $W_N$, $W_E$ and $W_V$, in an Earth reference frame, of speed with respect to the ground of the wind during a flight period of an aircraft, for use by equipment of said aircraft which is sensitive to the wind, comprising:

means for measuring including an anemobarometric sensor and an inertial unit which comprises accelerometers, at each time of rank i of a succession of times spread out over said flight period, a value $V_i$ of the modulus of the speed of said aircraft with respect to the air mass in which it moves and values $S_{Ni}$, $S_{Ei}$, $S_{Vi}$ of the three components, in said Earth reference frame, of the ground speed of said aircraft;

a digital memory for storing said measured values; and computer means including a microprocessor, for solving, using the method of least squares, a system of equations with three unknowns $W_N$, $W_E$, and $W_V$, in which system a current equation is:

$$2(S_{Ni}-S_{NR})W_N + 2(S_{Ei}-S_{ER})W_E + 2(S_{Vi}-S_{VR})W_V = S_{Ni}^2 - S_{NR}^2 + S_{Ei}^2 - S_{ER}^2 + S_{Vi}^2 - S_{VR}^2 + V_R^2 - V_i^2$$

$V_R$, $S_{NR}$, $S_{ER}$ and $S_{VR}$ being values, stored before the time of rank i in said digital memory, of said modulus and of said three components of the ground speed of said aircraft, respectively, wherein said three components are output to said equipment.

2. Device as claimed in claim 1 wherein said succession of times spread out over said period comprises in all n times, n being at least equal to 3, said digital memory stores the values measured at any time of rank j, less than i, and said computer means solves a system of $n(n-1)/2$ equations.

3. Device as claimed in claim 1 wherein said digital memory stores averages of a plurality of values measured at times of rank j, less than i, and said computer means solves a system of $(i-1)$ equations in real time.

4. The device as claimed in claim 1 wherein said anemobarometric sensor comprises a Pitot tube which delivers a valid result for said value $V_i$ of the modulus of the speed of said aircraft with respect to the air only when said modulus is greater than a given threshold and wherein, when said modulus becomes less than said given threshold, the last validly determined components $W_N$, $W_E$ and $W_V$ of the speed of the wind are stored so as to be composed with said measured values $S_{Ni}$, $S_{Ei}$ and $S_{Vi}$ of the three components of the ground speed of said aircraft for estimating the speed of said aircraft with respect to the air.

5. Device for providing the three components $W_N$, $W_E$, $W_V$, in an Earth reference frame, of speed with respect to the ground of the mean wind during a flight period of an aircraft, for use by equipment of said aircraft which is sensitive to the wind, comprising:

means for measuring including an anemobarometric sensor and an inertial unit which comprises accelerometers, at each time of rank i of a succession of times spread out over said flight period, a value $V_i$ of the modulus of the speed of the aircraft with respect to the air mass in which it moves, values $S_{Ni}$, $S_{Ei}$ and $S_{Vi}$ of the three components, in said Earth reference frame, of the ground speed of said aircraft, and a value $\theta_i$ of the pitch angle, a digital memory for storing said measured values; and computer means including a microprocessor for computing the vertical components $W_V$ from the formula:

$$W_V = (1/i) \sum_{k=1}^{i} S_{Vk} - V_k \sin\theta_k$$

and for solving, using the method of least squares, the system of equations in which the two unknowns are the two horizontal components $W_N$ and $W_E$, in which system a current equation is:

$$2(S_{Ni}-S_{NR})W_N + 2(S_{Ei}-S_{ER})W_E = S_{Ni}^2 - S_{NR}^2 + S_{Ei}^2 - S_{ER}^2 + V_R^2 \cos^2\theta_R - V_i^2 \cos^2\theta_i$$

$V_R$, $S_{NR}$, $S_{ER}$ and $\theta_R$ being values, the time of rank i in said digital memory, of said modulus, of said three components of the ground speed of said aircraft and of said pitch angle, respectively, wherein said three components are output to said equipment.

6. Device as claimed in claim 5, wherein said succession of times spread out over said period comprises in all n times, n being at least equal to 3, said digital memory stores the values measured at any time of rank j, less than 1, and said computer means solves a system of $n(n-1)/2$ equations.

7. Device as claimed in claim 5, wherein said digital memory stores averages of a plurality of values measured at times of rank j, less than i, and said computer means solves a system of $(i-1)$ equations in real time.

8. The device as claimed in claim 5, wherein said anemobarometric sensor comprises a Pitot tube which delivers a valid result for said value $V_1$ of the modulus of the speed of said aircraft with respect to the air only when said modulus is greater than a given threshold and wherein, when said modulus becomes less than said given threshold, the last validity determined components $W_N$, $W_E$ and $W_V$ of the speed of the wind are stored so as to be composed with said measured values $S_{Ni}$, $S_{Ei}$ and $S_{Vi}$ of the three components of the ground speed of said aircraft for estimating the speed of said aircraft with respect to the air.

9. An automated method for providing the three components $W_N$, $W_E$ and $W_V$, in an Earth reference frame, of speed with respect to the ground of the mean wind during a flight period of an aircraft, comprising:

generating and outputting a synchronization signal T by a computer means;

inputting said synchronization signal T to a measuring means to establish a succession of measurement times, each of rank i, over said flight period;

measuring and outputting by said measuring means at each time of rank i, a value $V_i$ of the modulus of the speed of said aircraft with respect to the air mass in which it moves and the values $S_{Ni}$, $S_{Ei}$ and $S_{Vi}$ of the three components, in said Earth reference frame, of the ground speed of said aircraft;

storing said values in a digital memory;

inputting said values $V_i$, $S_{Ni}$, $S_{Ei}$ and $S_{Vi}$ from said measuring means and values $V_R$, $S_{NR}$, $S_{ER}$ and $S_{VR}$ being values, stored in said digital memory before the time of rank i, of said modulus and of said three components of the ground speed of said aircraft, respectively, to said computer means;

solving with said computer means, using the method of least squares, a system of equations with three unknowns $W_N$, $W_E$, $W_V$ in which system a current equation is:

$$2(S_{Ni}-S_{NR})W_N+2(S_{Ei}-S_{ER})W_E$$
$$+2(S_{Vi}-S_{VR})W_V=S_{Ni}^2-S_{NR}^2+S_{Ei}^2$$
$$-S_{ER}^2+S_{Vi}^2-S_{VR}^2+V_R^2-V_i^2;$$

and outputting said three components from said computer means for use by equipment of said aircraft which are sensitive to the wind.

10. The method as claimed in claim 9, wherein said succession of times spread out over said period comprises in all n times, n being at least equal too 3, s aid values stored before the time of rank i are those measured at any time of rank j, less than i, and a system of n (n−1)/2 equations is solved.

11. The method as claimed in claim 9, wherein said values stored before the time of rank i are averages of a plurality of values measured at times of rank j, less than i, and a system of (i−1) equations is solved in real time.

12. An automated method for providing the three components $W_N$, $W_E$, and $W_V$, in an Earth reference frame, of speed with respect to the ground of the mean wind during a flight period of an aircraft, comprising:

generating and outputting a synchronization signal T by a computer means;

inputting said synchronization signal T to a measuring means to establish a succession of measurement times, each of rank i, over said flight period;

measuring and outputting by said measuring means at each time of rank i, a value $V_i$ of the modulus of the speed of said aircraft with respect to the air mass in which it moves and the values $S_{Ni}$, $S_{Ei}$ and $S_{Vi}$ of the three components, in said Earth reference frame, of the ground speed of said aircraft, and a value $\theta_i$ of the pitch angle;

storing said values in a digital memory;

inputting said values $V_i$, $S_{Ni}$, $S_{Ei}$, $S_{Vi}$ and $\theta_i$ from said measuring means and values $V_R$, $S_{NR}$, $S_{ER}$, $S_{VR}$ and $\theta_r$ being values, stored in said digital memory before the time of rank i, of said modulus, of said three components of the ground speed of said aircraft and of said pitch angle, respectively, to said computer means;

solving with said computer means the vertical component $W_V$ from the formula:

$$W_V = (1/i) \sum_{k=1}^{i} S_{Vk} - V_k \sin\theta_k$$

and, using the method of least squares, a system of equations with two unknowns $W_N$ and $W_E$, in which system a current equation is:

$$2(S_{Ni}-S_{NR})W_N+2(S_{Ei}-S_{ER})W_E=S_{Ni}^2-S_{NR}^2$$
$$+S_{Ei}^2-S_{ER}^2+V_R^2\cos^2\theta_R-V_i^2\cos^2\theta_i;$$

and outputting said three components from said computer means for use by equipment of said aircraft which are sensitive to the wind.

13. The method as claimed in claim 12, wherein said succession of times spread out over said period comprises in all n times, n being at least equal to 3, said values stored before the time of rank i are those measured at any time of rank j, less than i, and a system of n(n−1)/2 equations is solved.

14. The method as claimed in claim 12, wherein said values stored before the time of rank i are averages of a plurality of values measured at times of rank j, less than i, and a system of (i−1) equations is solved in real time.

15. A device for providing the three components $W_N$, $W_E$ and $W_V$, in an Earth reference frame, of speed with respect to the ground of the wind during a flight period of an aircraft, for use by equipment of said aircraft which is sensitive to the wind, comprising:

anemobarometric means for measuring, at each time of rank i of a succession of times spread out over said flight period, a value $V_i$ of the modulus of the speed of said aircraft with respect to the air mass in which it moves;

means for measuring including a Doppler radar means and an attitude means, at each time of rank i of a succession of times spread out over said flight period, values $S_{Xi}$, $S_{Yi}$, $S_{Zi}$ of the three components, in said aircraft reference frame, of the ground speed of said aircraft, and the heading $\psi$, pitch $\theta$ and roll $\phi$ angles of the aircraft and computing values $S_{Ni}$, $S_{Ei}$, $S_{Vi}$ of the three components, in said Earth reference frame, of the ground speed of said aircraft at each time of rank i;

a digital memory for storing at least some of said measured values; and computer means including a microprocessor, for solving, using the method of least squares, a system of equations with three unknowns $W_N$, $W_E$, and $W_V$, in which system a current equation is:

$$2(S_{Ni}-S_{NR})W_N+2(S_{Ei}-S_{ER})W_E$$
$$+2(S_{Vi}-S_{VR})W_V=S_{Ni}^2-S_{NR}^2+S_{Ei}^2-$$
$$S_{ER}^2+S_{Vi}^2-S_{VR}^2+V_R^2-V_i^2$$

$V_R$, $S_{NR}$, $S_{ER}$ and $S_{VR}$ being values, stored before the time of rank i in said digital memory, of said modulus and of said three components of the ground speed of said aircraft, respectively, wherein said three components are output to said equipment.

16. Device as claimed in claim 15 wherein said succession of times spread out over said period comprises in all n times, n being at least equal to 3, said digital memory stores the values measured at any time of rank j, less than i, and said computer means solves a system of $n(n-1)/2$ equations.

17. Device as claimed in claim 15 wherein said digital memory stores averages of a plurality of values measured at times of rank j, less than i, and said computer means solves a system of $(i-1)$ equations in real time.

18. The device as claimed in claim 15 wherein said anemobarometric sensor comprises a Pitot tube which delivers a valid result for said value $V_i$ of the modulus of the speed of said aircraft with respect to the air only when said modulus is greater than a given threshold and wherein, when said modulus becomes less than said given threshold, the last validly determined components $W_N$, $W_E$ and $W_V$ of the speed of the wind are stored so as to be composed with said measured values $S_{Ni}$, $S_{Ei}$ and $S_{Vi}$ of the three components of the ground speed of said aircraft for estimating the speed of said aircraft with respect to the air.

19. Device for providing the three components $W_N$, $W_E$, $W_V$, in an Earth reference frame, of speed with respect to the ground of the mean wind during a flight period of an aircraft, for use by equipment of said aircraft which is sensitive to the wind, comprising:
- anemobarometric measuring means for measuring, at each time of rank i of a succession of times spread out over said flight period, a value $V_i$ of the modulus of the speed of said aircraft with respect to the air mass in which it moves;
- means for measuring including a Doppler radar means and an attitude means, at each time of rank i of a succession of times spread out over said flight period, values $S_{Xi}$, $S_{Yi}$, $S_{Zi}$ of the three components, in said aircraft reference frame, of the ground speed of said aircraft, and the heading $\psi$, pitch $\theta$ and roll $\phi$ angles of the aircraft and computing values $S_{Ni}$, $S_{Ei}$, $S_{Vi}$ of the three components, in said Earth reference frame, of the ground speed of said aircraft at each time of rank i;
- a digital memory for storing at least some of said measured values; and
- computer means including a microprocessor for computing the vertical components $W_V$ from the formula:

$$W_V = (1/i) \sum_{k=1}^{i} S_{Vk} - V_k \sin\theta_k$$

and for solving, using the method of least squares, the system of equations in which the two unknowns are the two horizontal components $W_N$ and $W_E$, in which system a current equation is:

$$2(S_{Ni}-S_{NR})W_N + 2(S_{Ei}-S_{ER})W_E = S_{Ni}^2 - S_{NR}^2 + S_{Ei}^2 - S_{ER}^2 + V_R^2 \cos^2\theta_R - V_i^2 \cos^2\theta_i$$

$V_R$, $S_{NR}$, $S_{ER}$ and $\theta_R$ being values, stored before the time of rank i in said digital memory, of said modulus, of said three components of the ground speed of said aircraft and of said pitch angle, respectively, wherein said three components are output to said equipment.

20. Device as claimed in claim 19, wherein said succession of times spread out over said period comprises in all n times, n being at least equal to 3, said digital memory stores the values measured at any time of rank j, less than 1, and said computer means solves a system of $n(n-1)/2$ equations.

21. Device as claimed in claim 19, wherein said digital memory stores averages of a plurality of values measured at times of rank j, less than i, and said computer means solves a system of $(i-1)$ equations in real time.

22. The device as claimed in claim 19, wherein said anemobarometric sensor comprises a Pitot tube which delivers a valid result for said value $V_1$ of the modulus of the speed of said aircraft with respect to the air only when said modulus is greater than a given threshold and wherein, when said modulus becomes less than said given threshold, the last validity determined components $W_N$, $W_E$ and $W_V$ of the speed of the wind are stored so as to be composed with said measured values $S_{Ni}$, $S_{Ei}$ and $S_{Vi}$ of the three components of the ground speed of said aircraft for estimating the speed of said aircraft with respect to the air.

* * * * *